United States Patent

Hahn

[11] Patent Number: 6,106,212
[45] Date of Patent: Aug. 22, 2000

[54] POWER-UP VEHICLE RESTRAINT

[75] Inventor: Norbert Hahn, Franklin, Wis.

[73] Assignee: Rite-Hite Holding Corporation, Milwaukee, Wis.

[21] Appl. No.: 09/178,868

[22] Filed: Oct. 26, 1998

[51] Int. Cl.[7] .................................................. B65G 69/00
[52] U.S. Cl. .......................................... 414/401; 414/584
[58] Field of Search .................................. 414/396, 401, 414/584

[56] References Cited

U.S. PATENT DOCUMENTS

| | | | |
|---|---|---|---|
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 14/71.3 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,553,895 | 11/1985 | Ellis | 414/401 |
| 4,555,211 | 11/1985 | Metz | 414/401 |
| 4,560,315 | 12/1985 | Hahn | 414/401 |
| 4,695,216 | 9/1987 | Erlandsson | 414/401 |
| 4,759,678 | 7/1988 | Hageman | 414/401 |
| 4,815,918 | 3/1989 | Bennett et al. | 414/401 |
| 4,865,508 | 9/1989 | Carlson | 414/401 |
| 4,887,954 | 12/1989 | Gregerson et al. | 414/401 |
| 4,915,568 | 4/1990 | West | 414/401 |
| 4,938,648 | 7/1990 | Horan | 414/401 |
| 4,973,213 | 11/1990 | Erlandsson | 414/401 |
| 5,026,242 | 6/1991 | Alexander | 414/401 |
| 5,071,306 | 12/1991 | Alexander | 414/396 X |
| 5,297,921 | 3/1994 | Springer et al. | 414/401 |
| 5,702,223 | 12/1997 | Hahn et al. | 414/401 |
| 5,882,167 | 3/1999 | Hahn et al. | 414/396 X |

Primary Examiner—James W. Keenan
Attorney, Agent, or Firm—Marshall, O'Toole, Gerstein, Murray & Borun

[57] ABSTRACT

A vehicle restraint for a truck loading dock includes an actuator that rides up with a carriage to sense that a truck's ICC bar is within a predetermined region before fully extending a restraining member to engage the bar. The carriage and restraining member are raised and lowered by a drive unit, such as a cable extending from a winch. The winch may be attached directly to the carriage, or optionally remotely mounted to the dock. One end of the cable connects to a spring that compensates for incidental vertical movement of the ICC bar caused by the truck being loaded or unloaded. Large downward movement of the ICC bar is accommodated by a clutch associated with the winch. For large upward movement, the winch automatically restarts to pull the carriage up to meet the new height of the bar. An optional ICC bar deflector mounted at the base of the dock, along side the carriage, wedges underneath an exceptionally low ICC bar as the truck backs into the dock. The deflector guides and lifts the low bar above the actuator to prevent premature and uncontrolled extension of the restraining member.

16 Claims, 7 Drawing Sheets

POWER-UP VEHICLE RESTRAINT

BACKGROUND OF THE INVENTION

1. Field of the Invention

The subject invention generally pertains to a device and method for restraining a truck from accidentally moving away from a loading dock, and more specifically to engaging an ICC bar of a truck.

2. Description of Related Art

When a truck backs against a loading dock, it can be important to restrain the truck from accidentally moving too far away from the dock while loading or unloading the truck. This is often accomplished by a hook-style vehicle restraint that grabs what is often referred to in the industry as an ICC bar or a Rear Impact Guard (RIG). An ICC bar or RIG is a bar or beam that extends horizontally across the rear of a truck below the truck bed. It helps prevent an automobile from under-riding the truck in a rear-end collision.

To effectively restrain the truck, it can be desirable to control the position of the vehicle restraint relative to the ICC bar. This can be difficult, since the height and shape of ICC bars vary among trucks. Moreover, the height can vary with just one truck as weight is added or removed from the truck while at the loading dock.

This problem is addressed in the vehicle restraint described in U.S. Pat. No. 4,264,259. The vehicle restraint employs springs to position and maintain a carriage up against the underside of a truck's ICC bar. Once the carriage is properly positioned, a drive motor rotates a hook into engagement with the bar. Although effective, the '259 device requires two drive mechanisms: one for the carriage and a second for rotating the hook. The carriage is biased into a raised position by the springs, while the hook is motor driven.

Another device that addresses the issue of aligning a vehicle restraint to an ICC bar is disclosed in U.S. Pat. No. 4,759,678. The apparatus has an air cylinder that pushes directly against a hook to lift the hook upward. A carriage essentially hanging from the hook rises with it, until the carriage meets an obstruction. If the obstruction happens to be a properly positioned ICC bar, the hook continues to rise out of the carriage to form a barrier to horizontal movement of the bar.

Although the '678 vehicle restraint accommodates vertical position variations of ICC bars, it overlooks at least one horizontal position that could be dangerously unsafe. In particular, if an ICC bar was to catch the forward-most tip of carriage 12, beyond hook 32, hook 32 can still rise, and limit switch 47 will indicate that the truck is hitched when it actually is not. Also, any debris or ice binding carriage guide 13 could allow hook 32 to extend before carriage 12 was even close to an ICC bar. Again, such a situation would trip limit switch 47 to indicate that the truck is safely hitched when it actually was not. Similarly, it also appears that the device could indicate that an ICC bar was safely restrained if the carriage simply reached the end of its travel at item 11 without engaging an ICC bar. Moreover, if the hook and carriage were inadvertently left at their upward position as a truck backed into the dock, the truck's ICC bar may hit the exposed cylinder rod. It appears that such an impact could easily cause extensive damage to a relatively delicate rod.

SUMMARY OF THE INVENTION

The subject invention is a novel vehicle restraint that includes an actuator in addition to a carriage and a restraining member. A drive unit raises the carriage up against the underside of an ICC bar. The actuator senses when the ICC bar is properly positioned before the restraining member fully extends to limit movement of the bar.

A potential advantage of the subject invention is the ability to ensure that an ICC bar is actually effectively restrained before providing an indication to a dock operator or truck driver that the bar is restrained.

Another benefit is the ability to prevent a hook-style restrainer from extending unless an ICC bar is within reach.

Another potential advantage would be to achieve a vehicle restraint having a very low profile without having to resort to installing a drive cylinder or other major component recessed in concrete.

Yet another advantage that may result from the invention is preventing a restraining member from fully extending as a consequence of a carriage binding on its track, reaching the end of its track, or catching an ICC bar that is not in a position to become effectively restrained by the restraining member.

DESCRIPTION OF THE PREFERRED EMBODIMENT

Figure 1:
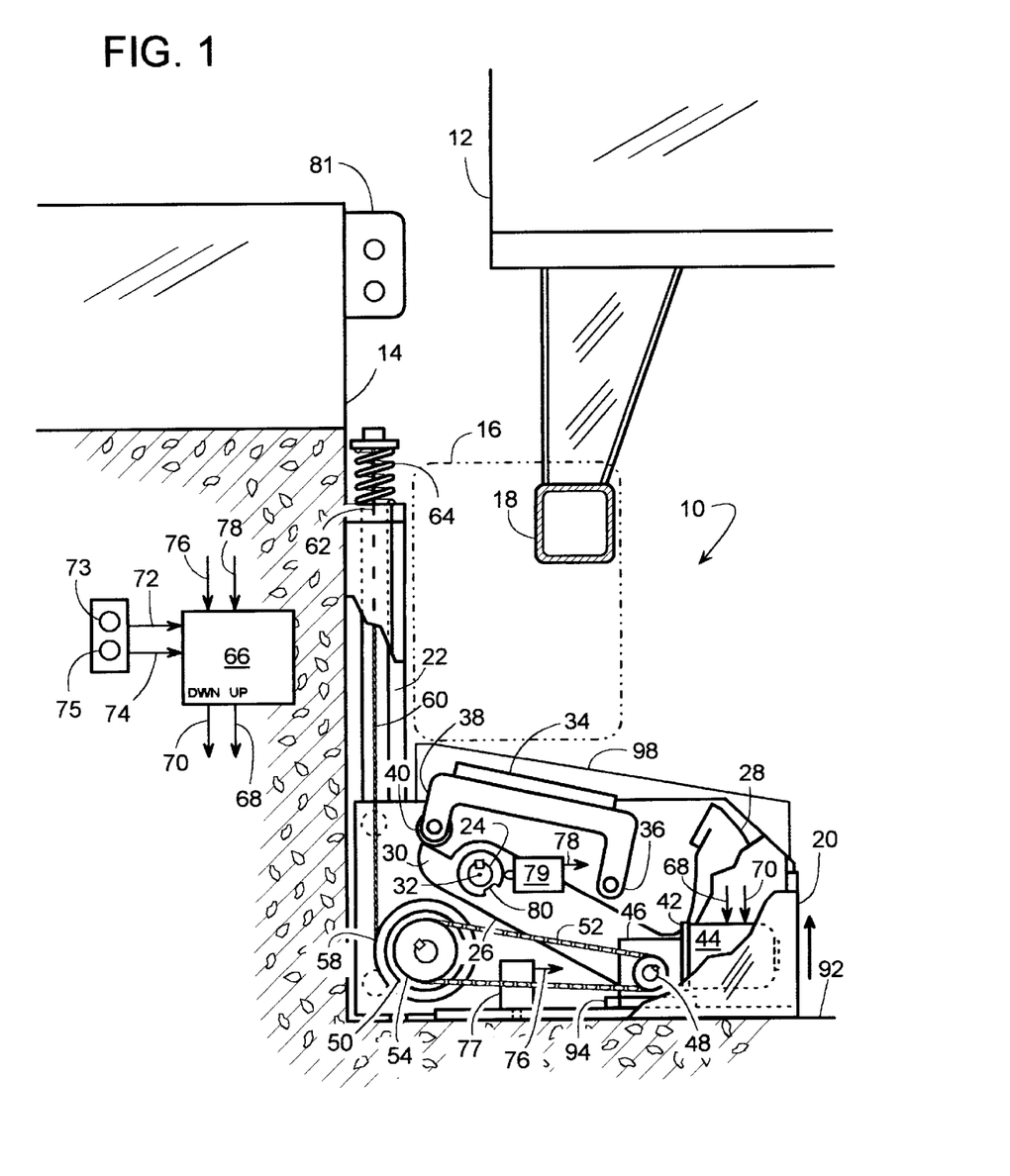
FIG. 1 is a side view of the invention showing a partial cut-away of a carriage at a lower rest position and a restraining member at its retracted position.
Figure 2:
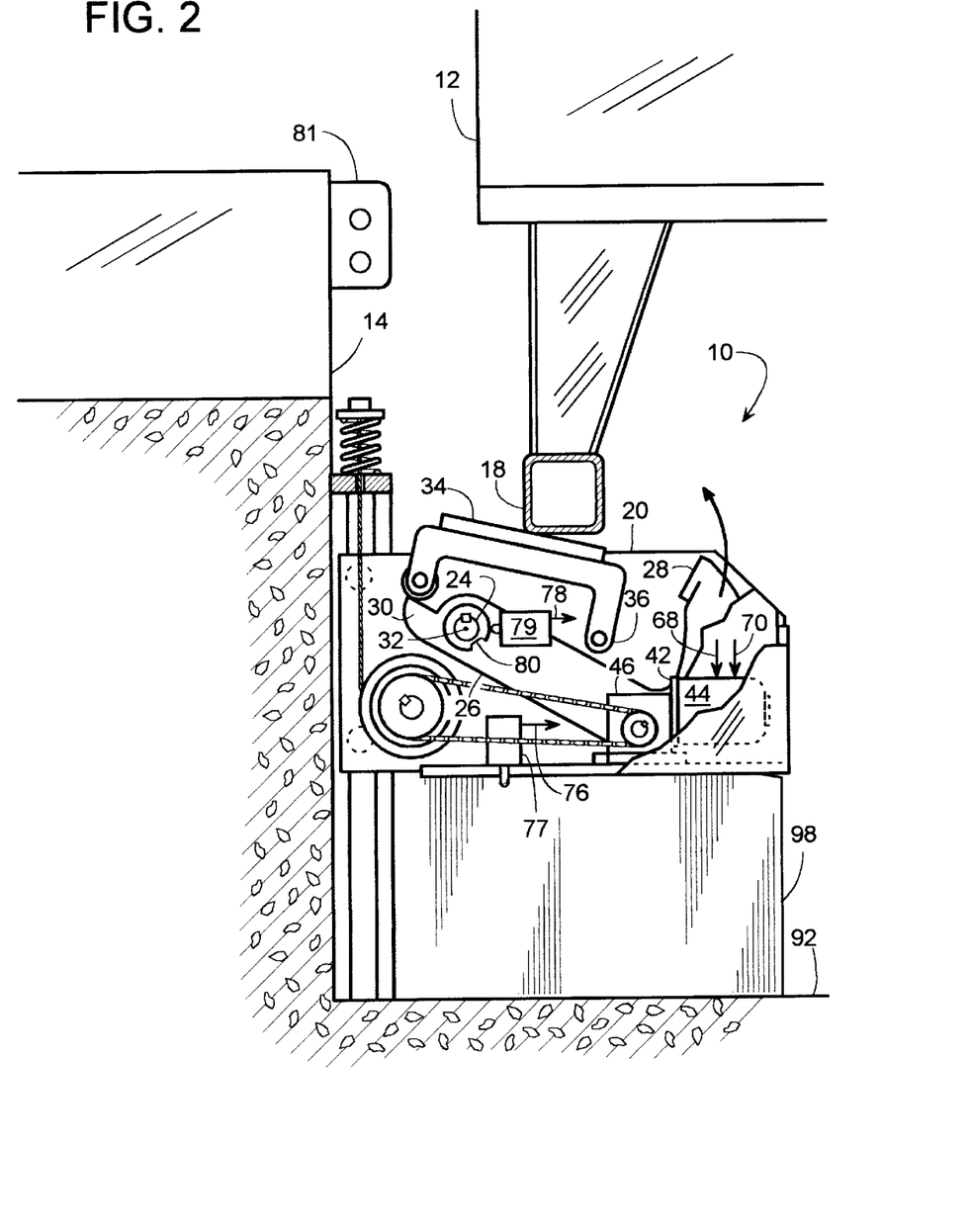
FIG. 2 is a side view of the carriage at a trip position with the restraining member in its retracted position.
Figure 3:
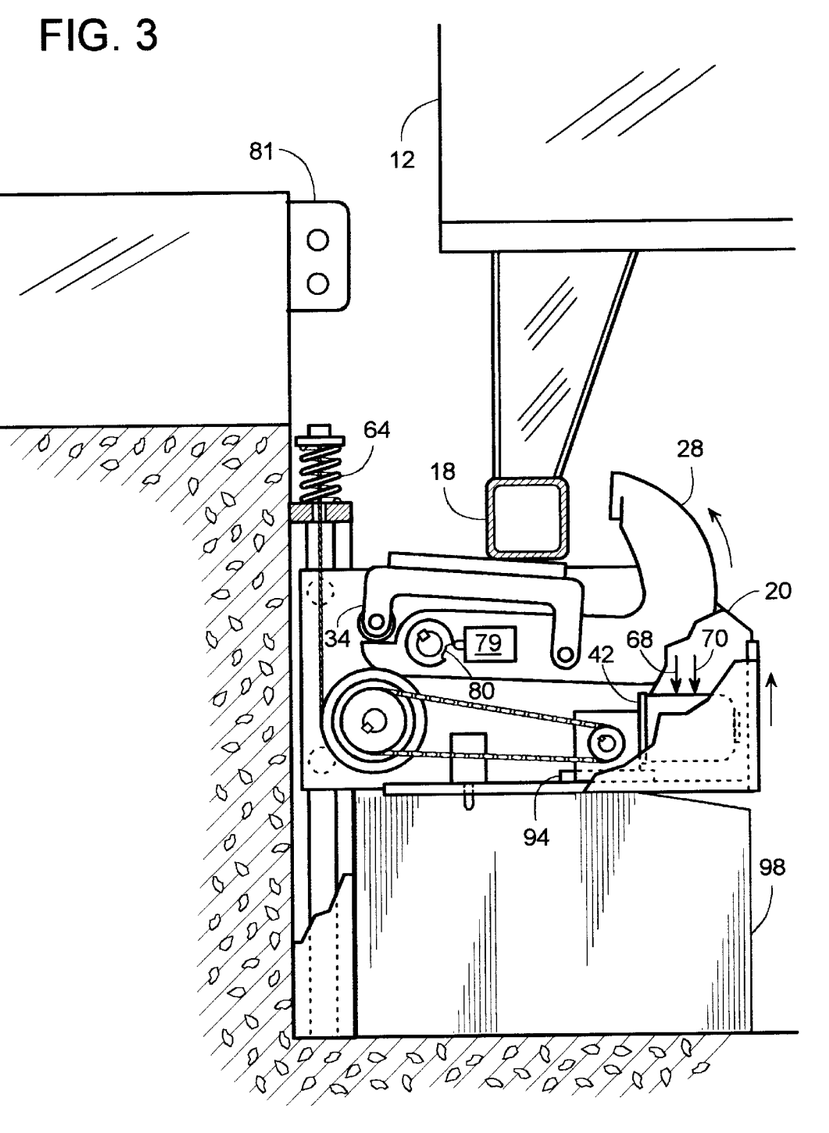
FIG. 3 is a side view showing the carriage moving from the trip position to the upper locked position, while the restraining member moves from the retracted position to the extended position.
Figure 4:
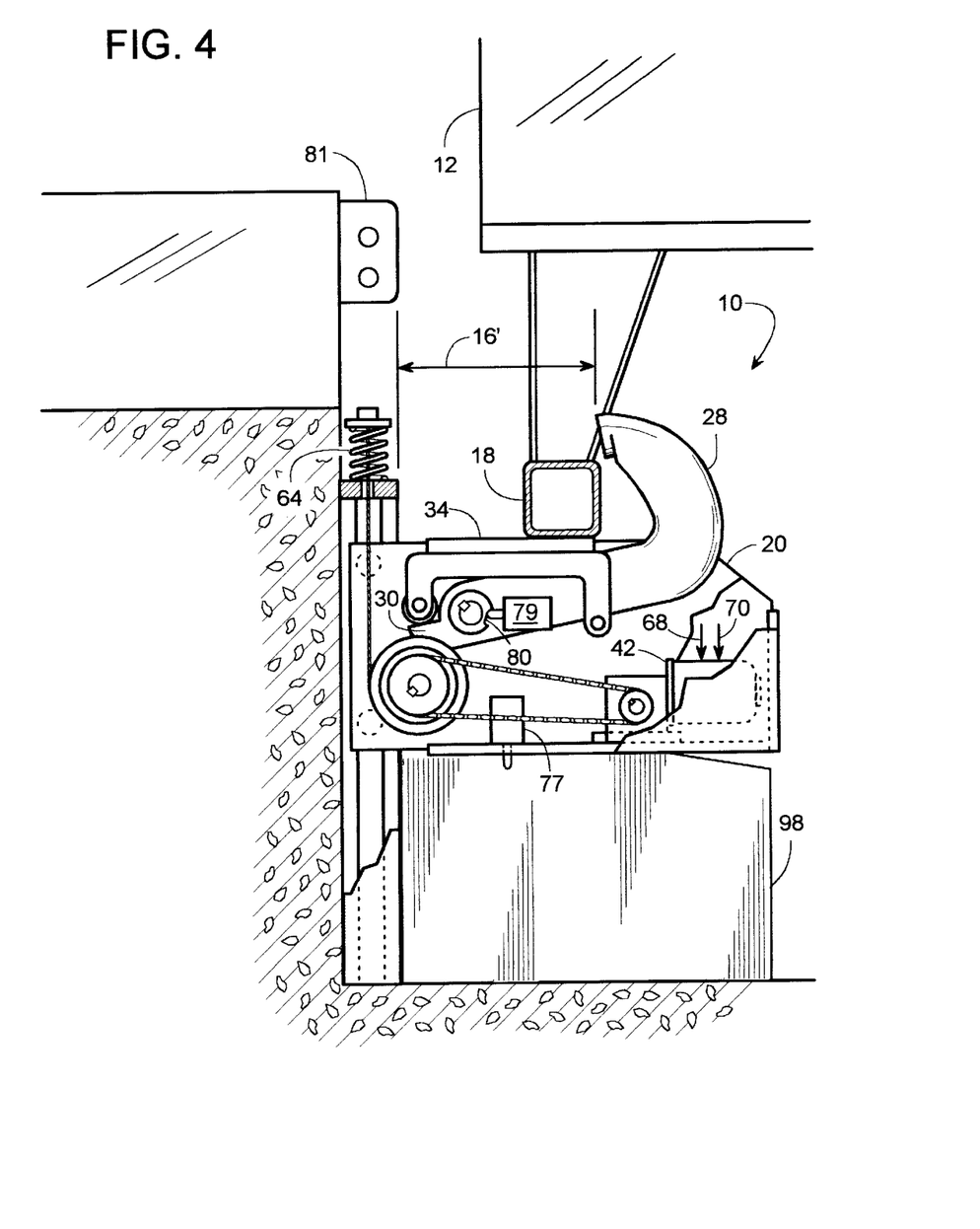
FIG. 4 is a side view of the carriage at an upper locked position and the restraining member at its extended position.

FIGS. 1, 2, 3, and 4 show in sequence one example of how a vehicle restraint 10, according to the invention, is operated to engage an ICC bar 18 of a truck 12. For an overview of an exemplary sequence of operation, a carriage 20 starts from a rest position, as shown in FIG. 1. From there, carriage 20 is driven upward to a trip position, where an actuator 34 just reaches bar 18, as shown in FIG. 2. From the trip position, carriage 20 continues upward while bar 18 pushes against actuator 34 to cause a restraining member 28 to start extending, as shown in FIG. 3. Carriage 20 then continues upward to a locked position, where restraining member 28 is in its operative, fully extended position, as shown in FIG. 4. As will be discussed below and in keeping with an aspect of the invention, actuator 34 ensures that bar 18 is within reach before restraining member 28 can extend.

Figure 5:
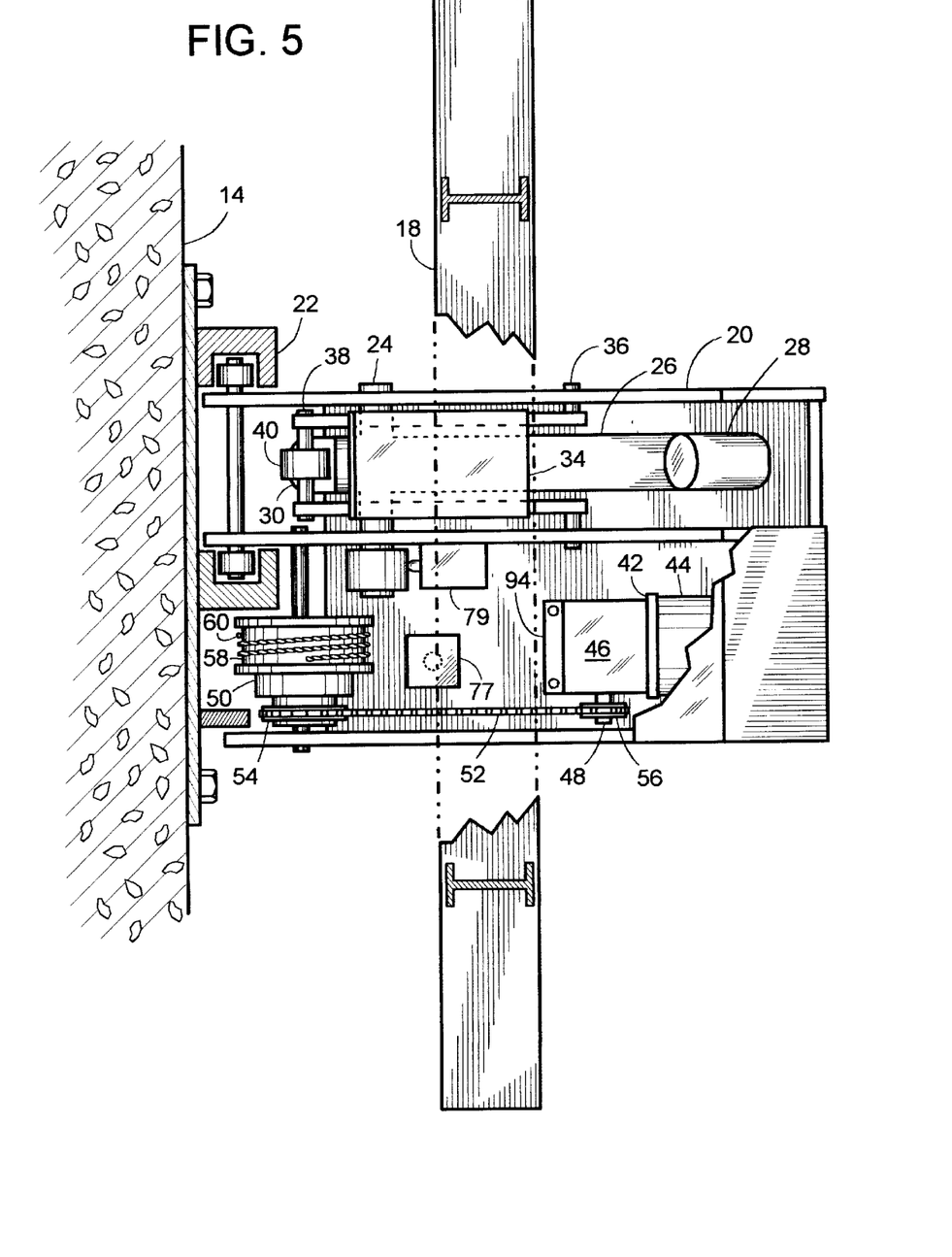
FIG. 5 is a top view of FIG. 1 that shows a partial cut-away of the invention.

To properly position carriage 20 relative to an ICC bar or RIG, the carriage is capable of substantially vertical movement along the dock face. Referring back to FIG. 1, in one embodiment of the invention, carriage 20 is driven up and down along a track 22 by way of a drive unit 42. Here, the drive unit includes a motor 44 coupled to a gearbox 46 (see also FIG. 5). A drive shaft 48 extending from gearbox 46 is coupled to a clutch 50. For example, clutch 50 is connected to the gearbox by way of a roller chain 52 and a set of sprockets 54 and 56. Clutch 50 is connected to a reel 58, which in turn can be connected to one end of a stranded cable 60. An opposite end 62 of cable 60 is coupled to dock 14 in series relationship with a resilient member such as, for example, a compression spring 64. Cable 60, which suspends the weight of carriage 20, raises and lowers carriage 20 as reel 58 respectively takes up and pays out cable 60. The operation could be compared to that of a winch with the carriage's direction of travel determined by the rotational direction of drive shaft 48.

Appropriate controls may be provided to regulate the motion of the carriage. For example, a control 66 provides a forward rotation output 68 to move carriage 20 upward and provides a reverse rotation output 70 to move carriage 20 downward. Up-output 68 and down-output 70 are similarly provided in response to inputs 72, 74, 76 and 78, which in this embodiment are respectively provided by a manually actuated up-switch 73, a manually actuated down-switch 75, a carriage home limit switch 77, and a restraining member limit switch 79. Carriage home limit switch 77 is attached to carriage 20 such that switch 77 trips when carriage 20 is at the rest position, as shown in FIG. 1. Of course, the actual mounting position of switch 77 can be at any one of a variety of locations and still indicate when carriage 20 is at its rest position. For example, switch 77 could be situated such that it is tripped by a projection extending from track 22. Restraining member limit switch 79 can be attached to carriage 20 and tripped by a detent 80 that is fixed relative to a shaft 24 and restraining member 28 to indicate when restraining member 28 has rotated upward to its extended position, as shown in FIG. 4. The output from limit switch may also be advantageously used to control signal lights or sounds—giving an indication to dock personnel that the vehicle is restrained.

In the device depicted, it is desirable to use the upward motive force exerted on the carriage by the drive to also place restraining member 28 in its operative position. Toward that end, the movement of restraining member 28 from its stored to its operative, fully extended position can be accomplished by having restraining member 28 be part of a pivoting member such as 26. Pivoting member 26 includes restraining member 28 at one end and a protrusion 30 at an opposite end with a pivot point 32 therebetween at shaft 24. Shaft 24 pivotally couples pivoting member 26 to carriage 20. Actuator 34, protruding above an upper surface of carriage 20, has one end 36 pivotally attached to carriage 20 and an opposite end 38 that engages protrusion 30 by way of a roller 40. With such an arrangement, ICC bar 18 acting upon actuator 34 forces roller end 38 to push against protrusion 30, which moves restraining member 28 upward through a range of extended positions as carriage 20 is driven upward from its trip position of FIG. 2 to its locked position of FIG. 4, in which restraining member is in its fully extended, operative position.

Because of the orientation of actuator 34, restraining member 28 will only extend from the carriage 20 when ICC bar 18 is within a predetermined distance from track 22. In the present embodiment, this predetermined distance is the width of capture region 16 (FIG. 1). In order for restraining member 28 to be able to rise out of carriage 20 and present a barrier to movement of bar 18, the bar cannot be in the restraining member's path of travel (i.e., the bar cannot be blocking the tip end of the restraining member as it attempts to exit the carriage). Similarly, the bar 18 cannot be forward of restraining member 28, else it would not be captured by the restraining member 28. It should be understood in these situations that control 66 can provide the appropriate sensing technology (e.g., timers or current sensors) to control the motor run times. Actuator 34 may thus be disposed within the width of region 16 to, in effect, sense the presence of an ICC bar 18. Of course, actuator 34 not only senses the presence of a properly-oriented bar 18, but also directly actuates the restraining member to the operative position of FIG. 5. Accordingly, the restraining member 28 does not move unless a vertically relatively fixed obstruction (i.e., an ICC bar) is disposed within the predetermined distance as the carriage 20 rises. Viewed another way, restraining member 28 only moves from its stored position towards its operative position when the ICC bar is within the predetermined distance from track 22. Since the restraining member is moved by actuator 34 upon contact between the ICC bar and actuator 34, the actuator serves the dual function of "sensing" the presence of a properly-positioned ICC bar, and also of translating the relative substantially vertical movement between a raising carriage and a stationary ICC bar into an extending movement of restraining member 28 to engage and restrain that same ICC bar.

The width of capture region 16 (i.e., the predetermined distance referred to above) may illustratively be defined as the distance between the front edge of track 22, and the tip (or distal end) of restraining member 28 when in the operative position (FIG. 4). This distance is designated 16' in FIG. 4. One of skill in the art will appreciate that track 22 is typically mounted so that its front face does not project beyond the front face of a dock bumper (e.g., item 81 of FIG. 4). The position of bumper 81 determines the rearmost possible position for the rear edge of vehicle 12. The height of capture region 16 may be determined by the height of carriage 20. The lowest possible ICC bar that can be captured is one just higher than carriage 20, unless a deflector is used, as described below. The upper end of the height of region 16 is generally determined by the length of track 22.

After carriage 20 stops at its locked position and restraining member 28 is at its operative position, truck 12 can be unloaded and loaded. However, this action can move ICC bar 18 up and down. Slight vertical movement is accommodated in this embodiment by spring 64, which allows carriage 20 to follow the movement. For large downward movement of ICC bar 18, clutch 50 may slip to allow carriage 20 to lower accordingly by paying out cable 60. When ICC bar 18 rises significantly, actuator 34 rises with it. This allows restraining member 28 to move downward toward the stored position until detent 80 becomes misaligned with limit switch 79 (see FIG. 3). The resulting change in the state of limit switch 79 causes upward output 68 to once again raise carriage 20. This can be accomplished by reeling in cable 60 a corresponding amount until detent 80 becomes realigned with limit switch 79. Detent 80 being realigned may indicate that restraining member 28 has returned generally to its fully extended, operative position, thus control 66 could discontinue upward output 68.

When truck 12 is ready to leave, an operator may actuate down-switch 75. Down-output 70 would rotate motor 44 (in a direction opposite that brought on by up-output 68) to unreel cable 60. Carriage 20 descends until home limit switch 77 trips to indicate that carriage 20 is at its rest position upon floor 92. At that point, control 66 discontinues down-output 70 to stop drive unit 42. The specific details of control 66 involve fundamental motor control that is readily carried out by an electromechanical relay circuit or by a conventional programmable controller, both of which are well known to those skilled in the art.

Figure 6:
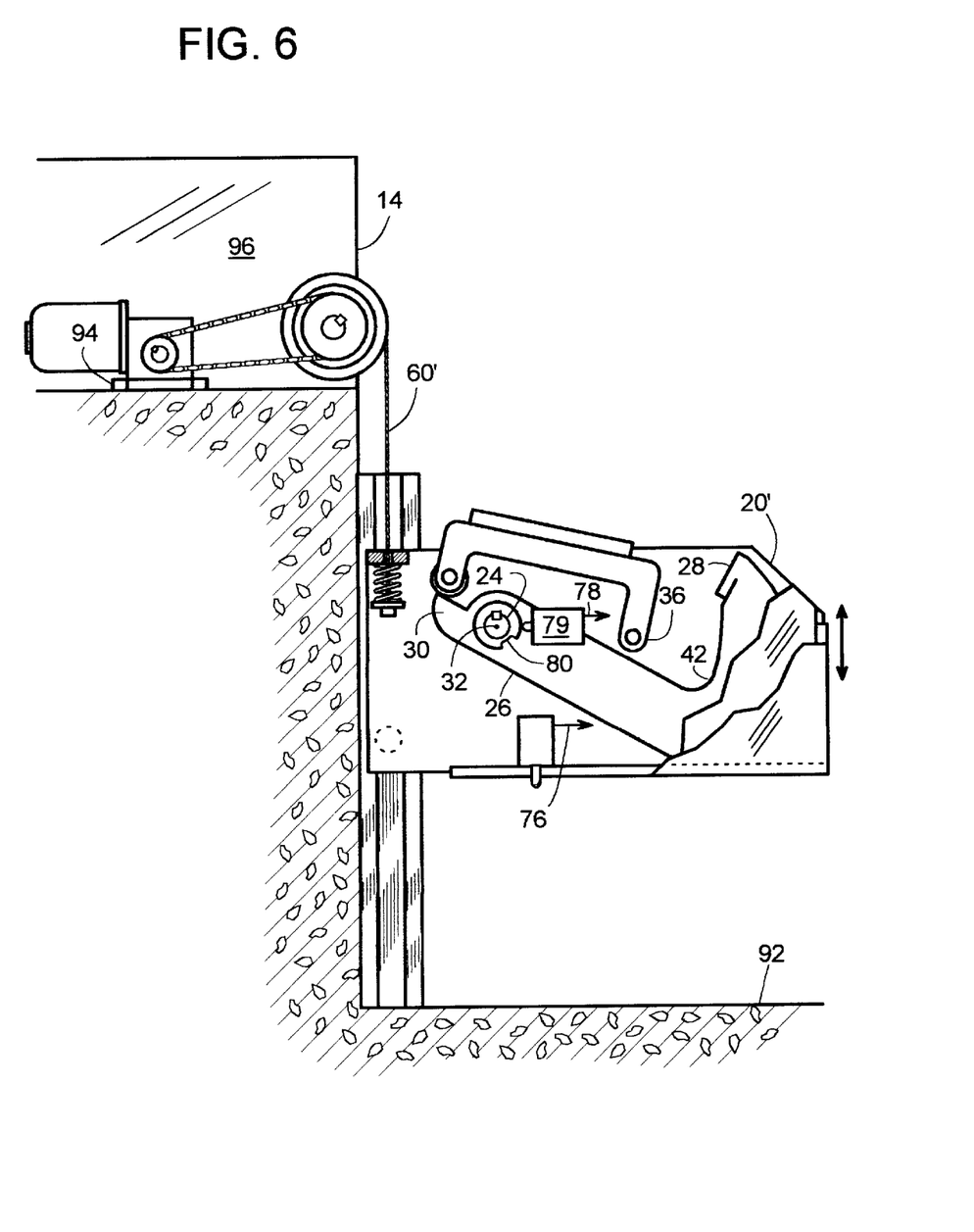
FIG. 6 is a side view showing a drive unit of a vehicle restraint remotely installed in the pit of a dock leveler.

In the exemplary embodiment of FIGS. 1–5, drive unit 42 includes a base 94 mounted to carriage 20, whereby carriage 20 and drive unit 42 move up and down together. In the embodiment of FIG. 6; however, base 94 is mounted to dock 14 near or within a dock leveler pit 96, and a carriage 20' is suspended by a cable 60'.

Figure 7:
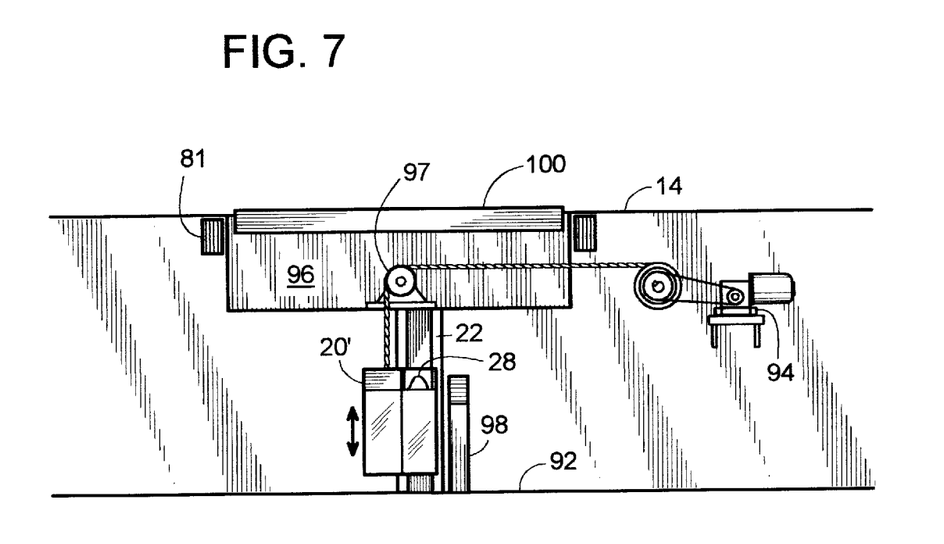
FIG. 7 is a front view showing a drive unit remotely mounted off to one side of a vehicle restraint.

In another embodiment of the invention, base 94 is attached to dock 14 off to one side of carriage 20', as shown in FIG. 7. An additional sheave 97 redirects the tension in the cable from horizontal to vertical. A top plate 100 of a dock leveler is shown within pit 96.

It should be noted that cable 60 schematically represents any one of a variety of elongated pliable members including, but not limited to a roller chain. Switches 77 and 79 are also illustrated schematically to represent any one of a variety of switches including, but not limited to, proximity switches and electromechanical switches. Another feature worth noting is an optional deflector 98 that is situated along side of carriage 20 and is fixed relative to dock 14 and/or floor 92. In the event that truck 12 brings ICC bar 18 in at an especially low elevation toward dock 14, deflector 98 could wedge underneath bar 18 to lift and guide it above actuator 34 to prevent pushing actuator 34 downward, thereby avoiding uncontrolled, premature extension of the restraining member 28.

Although the invention is described with respect to a preferred embodiment, modifications thereto will be apparent to those skilled in the art. Therefore, the scope of the invention is to be determined by reference to the claims that follow.

I claim:

1. A vehicle restraint that engages an ICC bar of a truck to limit an extent to which said truck can move relative to a dock, said vehicle restraint comprising:
    a track mounted to said dock;
    a carriage movably coupled to said track;
    a drive unit coupled to move said carriage along said track to a lower rest position, an upper lock position, and a trip position intermediately located between said upper lock position and said lower rest position;
    a restraining member coupled to said carriage, said restraining member being moveable between a retracted position and a range of extended positions including an operative position, said operative position being relatively higher than said retracted position in relation to said carriage, said restraining member limiting movement of said ICC bar to limit the extent to which said truck can move away from said dock when said restraining member is in said operative position; and
    an actuator coupled to and protruding above an upper surface of said carriage and spaced apart from said ICC bar when said carriage is between said lower rest position and said trip position, said actuator making contact with said ICC bar when said carriage is at said trip position, and said actuator being mechanically coupled to said restraining member to more said restraining member to said operative position as said carriage moves from said trip position to said upper lock position while said actuator engages said ICC bar.

2. The vehicle restraint of claim 1, further comprising a projection coupled to said restraining member to comprise a pivoting member having a pivot point between said projection and said restraining member, said pivoting member being pivotally coupled to said carriage at said pivot point with said projection coupling said actuator to said restraining member, said pivoting member rotating to move said restraining member toward the operative position in reaction to said actuator forcing said projection to rotate downward relative to said carriage.

3. The vehicle restraint of claim 1 wherein said drive unit is coupled to a clutch that slips upon said ICC bar forcing said carriage downward after said drive unit has stopped.

4. The vehicle restraint of claim 1 wherein said drive unit includes a base attached to said carriage, whereby said drive unit and said carriage move up and down together.

5. The vehicle restraint of claim 1 wherein said drive unit includes a base fixed relative to said dock.

6. The vehicle restraint of claim 1 further comprising a drive shaft extending from said drive unit; and an elongated pliable member coupled to said drive shaft and suspending said carriage.

7. The vehicle restraint of claim 6 wherein said elongated pliable member is a stranded cable.

8. The vehicle restraint of claim 6 wherein said elongated pliable member is a chain.

9. The vehicle restraint of claim 6, further comprising a resilient member operating in series relationship with said elongated pliable member to provide limited vertical give between said carriage and said track when said drive unit as stopped.

10. The vehicle restraint of claim 1 further comprising an inclined deflector fixed relative to said dock and adjacent to said carriage when said carriage is at said lower rest position, said deflector extending higher than said actuator when said carriage is at said lower rest position to prevent said ICC bar from contacting said actuator when said carriage is at said lower rest position.

11. A vehicle restraint that engages an ICC bar of a truck to limit an extent to which said truck can move relative to a dock, said vehicle restraint comprising:
    a track mounted to said dock;
    a carriage movably coupled to said track;
    a drive unit coupled to move said carriage along said track to a lower rest position, an upper lock position, and a trip position intermediately located between said upper lock position and said lower rest position, said drive unit coupled to a clutch that slips upon said ICC bar forcing said carriage downward after said drive unit has stopped;
    a restraining member coupled to said carriage, said restraining member being moveable between a retracted position and a range of extended positions including an operative position, said operative position being relatively higher than said retracted position in relation to said carriage, said restraining member limiting movement of said ICC bar to limit the extent to which said truck can move away from said dock when said restraining member is in said operative position;
    an actuator coupled to and protruding above said carriage and situated between said dock and said restraining member to define a predetermined distance within which said ICC bar can be restrained by said restraining member when in said operative position, said actuator being spaced apart from said ICC bar when said carriage is between said lower rest position and said trip position, said actuator making contact with said ICC bar when said ICC bar is within said distance and said carriage is at said trip position, and said actuator being coupled to urge said restraining member to said operative position as said carriage moves from said trip position to said upper lock position while said actuator engages said ICC bar within said distance; and
    a projection coupled to said restraining member to comprise a pivoting member having a pivot point between said projection and said restraining member, said pivoting member being pivotally coupled to said carriage at said pivot point with said projection coupling said actuator to said restraining member, said pivoting member rotating to move said restraining member toward the operative position in reaction to said actuator forcing said projection to rotate downward relative to said carriage.

12. The vehicle restraint of claim 11 wherein said drive unit includes a base attached to said carriage, whereby said drive unit and said carriage move up and down together.

13. The vehicle restraint of claim 11 wherein said drive unit includes a base fixed relative to said dock.

14. The vehicle restraint of claim 11 further comprising a drive shaft extending from said drive unit; and an elongated pliable member coupled to said drive shaft and suspending said carriage.

15. The vehicle restraint of claim 14 further comprising a resilient member operating in series relationship with said elongated pliable member to provide limited vertical compliance between said carriage and said track when said drive unit has stopped.

16. The vehicle restraint of claim 11 further comprising an inclined deflector fixed relative to said dock and adjacent to said carriage when said carriage is at said lower rest position, said deflector extending higher than said actuator when said carriage is at said lower rest position to prevent said ICC bar from contacting said actuator when said carriage is at said lower rest position.

* * * * *